United States Patent
Kim

(10) Patent No.: US 8,085,994 B2
(45) Date of Patent: Dec. 27, 2011

(54) IRIS IDENTIFICATION SYSTEM AND METHOD USING MOBILE DEVICE WITH STEREO CAMERA

(76) Inventor: Dae Hoon Kim, Seoul (KR)

(*) Notice: Subject to any disclaimer, the term of this patent is extended or adjusted under 35 U.S.C. 154(b) by 866 days.

(21) Appl. No.: 12/097,371

(22) PCT Filed: Jan. 8, 2007

(86) PCT No.: PCT/KR2007/000099
§ 371 (c)(1),
(2), (4) Date: Jun. 13, 2008

(87) PCT Pub. No.: WO2007/081122
PCT Pub. Date: Jul. 19, 2007

(65) Prior Publication Data
US 2008/0292144 A1 Nov. 27, 2008

(51) Int. Cl.
G06K 9/00 (2006.01)
H04N 7/18 (2006.01)
A61B 3/14 (2006.01)

(52) U.S. Cl. .......... 382/117; 382/154; 348/78; 351/206; 351/208

(58) Field of Classification Search .................. 382/117, 382/154; 348/42, 78; 351/206, 208
See application file for complete search history.

(56) References Cited

U.S. PATENT DOCUMENTS

| 6,526,160 | B1 | 2/2003 | Ito |
| 2002/0131622 | A1* | 9/2002 | Lee et al. ...................... 382/106 |
| 2005/0084137 | A1 | 4/2005 | Kim et al. |
| 2006/0165266 | A1* | 7/2006 | Hamza .......................... 382/117 |
| 2006/0210111 | A1* | 9/2006 | Cleveland et al. ............ 382/103 |
| 2009/0278658 | A1* | 11/2009 | Higashiyama ............... 340/5.82 |

FOREIGN PATENT DOCUMENTS

KR 10-2002-0016889 A 3/2002

* cited by examiner

Primary Examiner — John Strege
(74) Attorney, Agent, or Firm — John K. Park; Park Law Firm

(57) ABSTRACT

The present invention relates to a face recognition and/or iris recognition system and method using a mobile device equipped with a stereo camera, which acquire a stereo image of a user's face using at least two cameras or a method corresponding thereto and, even when the size of the stereo image is varied according to distance, correct the size of the stereo image. The stereo camera uses a single-focus lens with a long depth of focus to acquire a focused iris image over a wider range. When the user is not located at a position suitable for iris recognition, a message is sent to the user such that an iris image suitable for recognition is acquired. Furthermore, an iris image correction process according to distance is performed to prevent recognition rate from decreasing even when the size of the iris image is changed.

9 Claims, 3 Drawing Sheets

(a)

(b)

[Fig. 1]
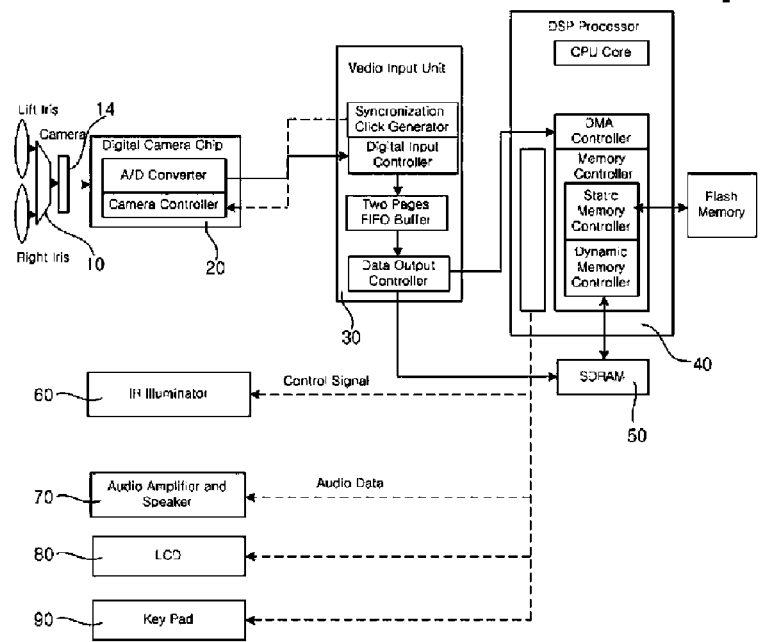
[Fig. 2]
(a)
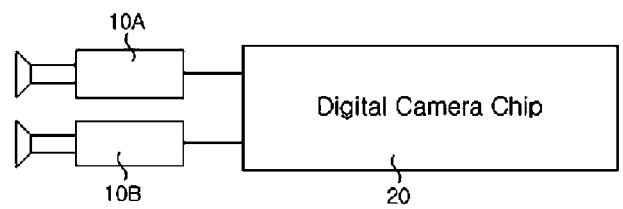
(b)
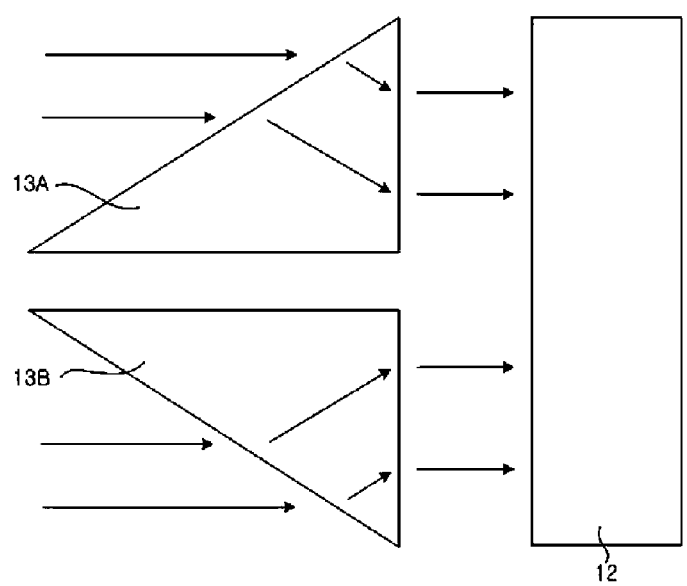

[Fig. 3]
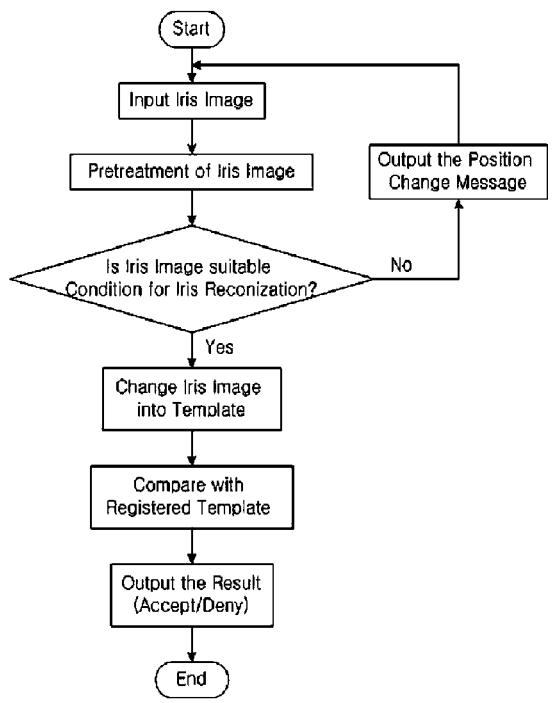
[Fig. 4]
(a)  (b)
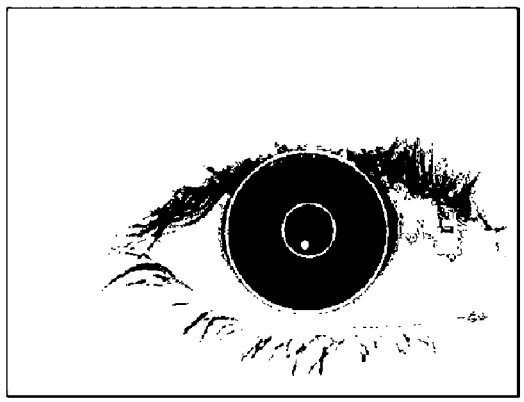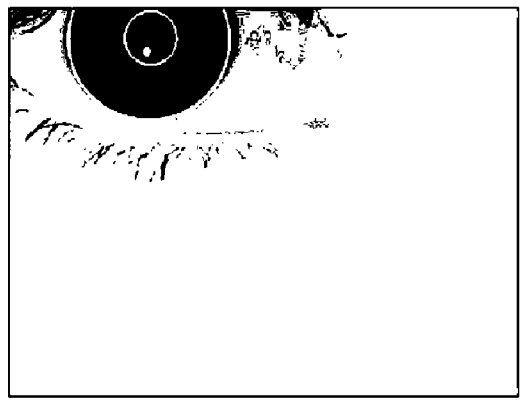
[Fig. 5]
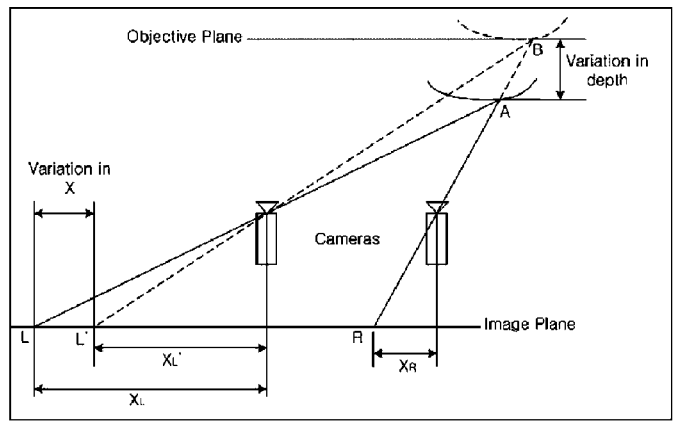

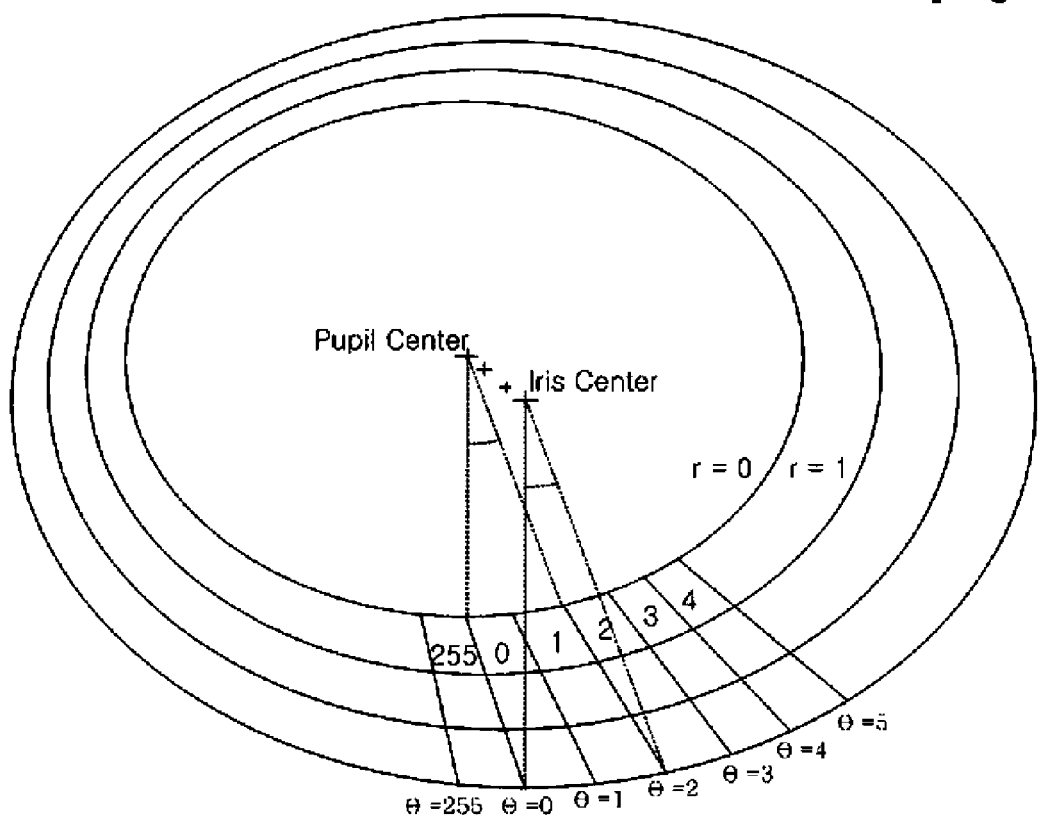
[Fig. 6]

IRIS IDENTIFICATION SYSTEM AND METHOD USING MOBILE DEVICE WITH STEREO CAMERA

TECHNICAL FIELD

The present invention relates to an iris recognition system and method Mobile device with stereo camera, such as a cellular phone, a portable terminal and a notebook computer, which can reduce the size of the mobile device, correct a variation in an image size by calculating a distance between the camera and a user's face and improve a recognition rate using an infrared filter when performing face recognition and/or iris recognition using the mobile device.

BACKGROUND ART

Conventional locking devices installed in offices or apartments have low security because keys or pass-cards used to unlock the locking devices are easily lost and copied. Furthermore, users must carry the keys or pass-cards and memorize pass numbers. To solve the problems of the conventional locking devices, a variety of studies on personal identification techniques with high security and convenience have been carried out.

Biometric systems are commercially used in order to solve the problems of the conventional locking devices. The biometric systems extract biometric information (fingerprint, face, iris, cornea, hand shape, vein of the back of the hand, voice and so on) of a person and compare the extracted biometric information with biometric information stored in a memory to identify the person. The biometric systems take a picture of a specific part of the body of the person using a camera to extract biometric information for recognition. A personal identification system using iris recognition is widely used.

A dedicated camera system is used to recognize the iris of a user. Conventional dedicated camera systems are divided into two. The first one performs a position adjustment function using a face recognition stereo camera and recognizes the correct position of an iris to take a picture of a focused iris, which is disclosed in Korean Patent Application No. 10-200300002822 entitled "Iris recognition system and iris recognition method using stereo face recognition". However, this camera system is irrelevant to iris recognition using a mobile device. The second camera system takes a picture of a focused iris using a camera having an auto zooming and auto focusing functions, which is used by LG, Panasonic and OKI. However, this camera system requires a large-size camera and thus the manufacturing cost is increased. Accordingly, it is difficult to apply the camera system to a mobile device.

DISCLOSURE OF INVENTION

Technical Problem

Accordingly, the present invention has been made in an attempt to solve the above-mentioned problems occurring in the prior art, and a primary object of the present invention is to provide an iris recognition system and method using a mobile device equipped with a stereo camera for acquiring an image suitable for face recognition and/or iris recognition, which can correct a variation in an image size according to a distance between the camera and a user's face by calculating the distance between the camera and the user's face considerably improve iris recognition rate.

Another object of the present invention is to provide an iris recognition system and method using a mobile device equipped with a stereo camera, which calculate the position of a user's face from a stereo image and inform the user of position change through a voice, characters or an image when the position of the user's face is not suitable for photographing the user's face and/or iris to easily adjust the position of the camera to a position suitable for face recognition and/or iris recognition to improve iris recognition rate.

Yet another object of the present invention is to provide an iris recognition system and method using a mobile device equipped with a stereo camera, which increase the sensitivity of the camera when recognizing an iris using an infrared filter mechanically or electronically to improve iris recognition rate.

Technical Solution

To accomplish the objects of the present invention, there is provided an iris recognition system including a stereo camera set in a mobile device, which has a lens with a long depth of focus in order to take a picture of the iris of a user, a digital camera chip for converting an analog image acquired by the stereo camera into a digital image, a controller for receiving the digital image output from the digital camera chip through a video input unit controlling video input and performing iris recognition and/or face recognition, and a means for transmitting the iris image to a remote server or a security device through the mobile device.

The stereo camera uses at least two cameras to acquire at least two images or uses at least two optical lenses for a single image sensor to acquire at least two images through the single image sensor.

The stereo camera includes an infrared filter mechanically or electronically controlled. An infrared illuminator is attached to the stereo camera, if required, in order to take a picture of the user's iris in the infrared region to acquire a distinct iris image.

When it is determined that a stereo image acquired by the stereo camera is not suitable for personal identification, the position of the user is calculated from the stereo image, and then the user is informed of position change through a voice, character or an image such that the user can easily control the camera to be located at a position suitable for face recognition and/or iris recognition.

It is determined that the stereo image is not suitable for personal identification when the boundary of the pupil and the iris of the user is extracted as a circle and the extracted circle is cut.

When the distance between the camera and the user's face is calculated from the stereo image, normalization that corrects the size of the stereo image using distance information is performed to correct a variation in the size of the stereo image according to the distance between the camera and the user's face when the iris is photographed to improve accuracy of iris recognition.

Advantageous Effects

The present invention sends a message to a user using a mobile device including a stereo camera so as to easily obtain an iris image. Furthermore, the present invention can perform face recognition and/or iris recognition with high recognition rate because it can obtain a corrected iris image. Accordingly, face recognition and/or iris recognition with high recognition rate can be carried out using a small mobile device without using an expensive large-size camera having an auto zooming and auto focusing functions.

BRIEF DESCRIPTION OF THE DRAWINGS

Further objects and advantages of the invention can be more fully understood from the following detailed description taken in conjunction with the accompanying drawings, in which:

FIG. 1 illustrates a configuration of an iris recognition system according to the present invention;

FIG. 2 illustrates a stereo camera according to an embodiment of the present invention;

FIG. 3 is a flow chart of an iris recognition method according to the present invention;

FIG. 4 is a view for explaining whether an iris image obtained according to the present invention is suitable for personal identification;

FIG. 5 is a view for explaining a method of calculating a distance between a stereo camera and an object according to the present invention; and FIG. 6 is a view for explaining a method of normalizing a size variation in an iris image depending on a distance between camera and iris according to the present invention.

BEST MODE FOR CARRYING OUT THE INVENTION

The present invention provides a method of calculating a distance between a stereo camera and an object in order to correct a variation in the size of the stereo image according to the distance between the camera stereo and a user's face when a user's iris is photographed using the distance between the stereo camera and the user's face to improve accuracy of iris recognition. FIG. 5 is a view for explaining this method.

A method of taking a stereo image of the user's face using CCD (Charge Coupled Device) cameras constructing the stereo camera 10 and calculating the distance between the cameras and the user's face or iris and a method of comparing a focal distance with a distance at which an iris image is acquired using a single-focus lens having a long focal depth to correct a variation in the size of the stereo image will now be explained with reference to FIG. 5.

The distance between the stereo camera and a user's eye that is an object can be calculated by measuring the distance between the center of the right eye and the center of the left eye on the X-axis from the stereo image acquired by the stereo camera. That is, a three-dimensional position is calculated using two images acquired from the same object from different standpoints. To represent this in a numerical expression, terms are defined as follows.

A left image is denoted as L-image, a right image is denoted as R-image and they make a stereo-pair. The L-image and R-image indicate the same point on the surface of an object, and the point is denoted as a corresponding point. For example, a spatial point A is indicated as a point R in the R-image and as a point L in the L-image, as illustrated in FIG. 5. Thus, the points L and R become a corresponding point. Similarly, points L and R can be obtained from a spatial point B moved from the point A.

When a data table containing data with respect to distance measurement, obtained through a previous camera calibration process, or data is stored in a memory, disparity at a point of the L-image and a corresponding point on the R-image can be measured using the data obtained through the calibration process and stored in the memory. This is represented as follows.

$$L(x,y) = R(x - D_x(x,y), y - D_y(x,y)) + N(x,y)$$

Here, $D_x$ and $D_y$ are projected values and represent disparity of position coordinates (x,y) of the R-image on OX and OY axes. $L(x,y)$ and $R(x,y)$ respectively denote the L-image and R-image and $N(x,y)$ is a function representing noise or a varied state caused by conditions such as light and a shadow.

In FIG. 5, an objective plane OXY is perpendicular to the lens of the stereo camera and it is placed at a position having an appropriate distance $$l$$

from the stereo camera.

$$z = \zeta(x,y)$$

represents a field for evaluating the surface of the object, and z denotes a distance from the objective plane (z=0). A distance variation with respect to a specific point of the object is represented as $$\Delta l = \zeta(x,y)$$

.Points on the objective plane are registered as basic disparity $d_\theta$. A variation in disparity values with respect to the points on the objective planes is represented as $$\Delta$$

d. The objective plane includes a point B. In this case, the point B causes basic disparity ($d_\theta = L' - R$). A point A is not placed on the objective plane and its disparity has a different value ($d_A = L - R$). In general, a distance between characteristic points on the surface of the object is less than the distance between the object and the stereo camera. Thus, this relationship can be represented as follows.

$$\frac{d_0}{f} = \frac{b}{l}, \frac{d_0 + \Delta_d}{f} = \frac{b}{l - \Delta l}, \Delta l \ll l$$

A formula for evaluating the distance between the stereo camera and the objective plane can be derived from this expression as follows.

$$z(x, y) = \frac{l^2}{fb}(\rho((x_L, y_L), (x_R, y_R)) - d_0)$$

MODE FOR THE INVENTION

FIG. 6 is a view for explaining a method of normalizing a size variation in an iris image depending on the distance between a camera and an iris according to the present invention.

Data between the inner boundary and outer boundary of the iris image can be transformed by a polar coordinate method. As shown in FIG. 6, the inner boundary and outer boundary of the iris image do not necessarily correspond to each other and they are divided into m angles having the same distance. An image segment obtained from the ith inner boundary segment to the ith outer boundary segment is divided into n radial samples represented as $p(r,\theta)$. The n radial samples can be calculated by a bilinear interpolation method.

A reference angle 0 degree is represented in the six o'clock direction, which indicates a direction right below the center of the pupil. The angle is gradually increased counterclockwise. At 0 degree, a pixel closest to the inner boundary is represented as the lowest address and the next pixel is obtained while gradually increasing the angle for a circle having the same radius. This process is repeated until a single circle is finished. Then, the process is repeated for a circle having an increased radius. That is, data obtained by the polar coordinate method can be represented by n×m samples.

A formula for obtaining a base size is as follows.

$$B=K/(D-D_0)$$

Here, D is the distance between a camera and an eye, measured in a face position adjustment process, and K and $D_0$ are constants evaluated in the camera calibration process.

FIG. 1 illustrates a configuration of an iris recognition system according to the present invention. A stereo camera 10 takes a picture of iris regions including the left and right pupils. The analog image acquired by the stereo camera 10 is converted into a digital image by a digital camera chip 20. The digital image output from the digital camera chip 20 is input to a controller 40 through a video input unit 30. The controller 40 controls the overall operation of a mobile device. In the present invention, the controller 40 extracts the image of the iris regions from the digital image, generates iris image information from the extracted image, stores the iris image information in a storage unit 50, allows the mobile device to be used or compares a reference iris image stored in a locking device such as a notebook computer with an iris image transmitted through a communication means to confirm whether the two iris images correspond to each other. When the iris of a user is confirmed in an external locking device installed in an office or a house, an iris image measured through the mobile device is transmitted to the locking device and compared with an iris image recorded in the locking device to recognize the user's iris.

An output port of the controller 40 is connected to an infrared illuminator 60 for increasing the sensitivity of the stereo camera, a voice output unit 70 for outputting a guide message to a user as a voice signal and a display 80 for informing the user of the guide message using characters. A key pad 90 by which the user operates an iris recognition function is also connected to the output port of the controller 40.

The stereo camera 10 includes CCD cameras 10A and 10B, as illustrated in FIG. 2(a) such that the CCD camera 10A takes a picture of the left eye and the CCD camera 10B takes a picture of the right eye to perform an iris recognition operation which will be described later. Otherwise, the stereo camera 10 can be constructed in such a manner that a single CCD 12 is divided into two regions, prism lenses 13A and 13B are respectively set in the two CCD regions, the left and right eyes are projected to corresponding parts of the CCD 12 through the respective prism lenses 13A and 13B to extract a stereo image, as illustrated in FIG. 2(b). Furthermore, an infrared filter can be set in the stereo camera 10 in such a manner as to be mechanically or electronically driven. In addition, the infrared illuminator 60 can be set in the stereo camera 10 in such a manner as to be electronically turned on and off. In this case, the user operates the key pad 90 such that the controller 40 controls the operations of the infrared filter and the infrared illuminator.

The operation of the iris recognition system according to the present invention is explained with reference to FIG. 3. When a user performs iris recognition using the mobile device according to the present invention, he/she pushes a 'start' button included in the key pad 90 and applies his/her eyes to an appropriate portion of the front side of the stereo camera 10. Then, the operation of the mobile device for iris recognition is carried out according to two methods. According to the first method, the user manually pushes a 'iris image acquisition finish' button of the key pad 90 to perform iris recognition. According to the second method, a sensor capable of sensing the user's motion is attached to the mobile device to automatically sense the position of the user's face or eyes and, when it is determined that the sensed position is suitable for acquisition of an iris image, the iris image is acquired.

When the iris image is acquired, the iris image is input and transmitted to the controller 40 through the video input unit 30. The controller 40 is designed in such a manner as to have at least three functions. The first one is a pre-processor function for determining whether an input iris image is suitable for iris recognition, and the second one is a function of converting the input iris image into a template for iris recognition.

The third one is a function of comparing the template input through the stereo camera with a previously stored template and outputting a recognition result value.

When it is determined that the input iris image is not suitable for iris recognition through the first function of the controller 40, that is, when a blurred iris image caused by defocus is input or when the position of the iris is out of the camera range so that an image of a part of the iris is acquired, a message informing the user that the iris image is not suitable for iris recognition is sent to the user through the voice output unit 60 or other means such as the display 80 such that the user takes a picture of the iris again.

This is because the iris image must be included in a predetermined region of the CCD 12. When the iris image is out of the predetermined region of the CCD 12, a part of the iris image is cut. Then, information is lost in the cut iris region so that accurate iris recognition cannot be performed.

A method of determining whether the iris image is out of the predetermined region of the CCD 12 is explained.

As shown in FIG. 4, the iris and pupil can be represented as two circles. FIG. 4(a) shows an image suitable for iris recognition and FIG. 4(b) shows an image that is not suitable for iris recognition. In the case of the image shown in FIG. 4(b), a part of the circle representing the iris is out of the predetermined region, and thus it can be determined whether the image is suitable for iris recognition by analyzing the pupil and iris region. Furthermore, iris image information is lost even when a part of the iris is covered with an eyelid. In this case, the user should open his/her eyes wide. When the user is located excessively close to or apart from the camera, the iris can also be out of the predetermined region. This is easily judged by using the stereo camera.

When the iris image is out of the predetermined region, this state is sensed using the aforementioned methods, and then an appropriate voice message or character message is sent to the user through the voice output unit 70 or the display 80 to move the user's position.

With respect to the third function of the controller 40, the registered iris image can be stored in a storage unit included in the mobile device for the purpose of security of the mobile device. Otherwise, the mobile device is connected with a remote server through wireless communication using a mobile network function and the registered iris image is stored in a database or a memory of the remote server for various security authentication services provided by the remote server. When the iris image stored in the database or memory of the remote server is compared with the iris image acquired by the stereo camera to perform iris recognition, a variety of security and authentication services for transmitting the iris image acquired by the stereo camera to the remote server and controlling the iris image in the remote server in order to reduce the quantity of transmitted data.

INDUSTRIAL APPLICABILITY

The iris recognition system and method according to the present invention capture an image suitable for face recognition and/or iris recognition using a stereo camera set in a mobile device and calculate the distance between the stereo camera and a user's face from the captured image to correct a variation in size of the image according to the distance. When the position of the user's face is not suitable for acquisition of an iris image, the present invention calculates the user's position from the acquired stereo image and informs the user of position change through a voice, characters or an image such that the position of the stereo camera can be easily adjusted to a position suitable for iris recognition. Furthermore, the present invention compares the acquired iris image with an iris image stored in the mobile device or a memory of a remote server or a locking device using the mobile device equipped with the stereo camera constructed in such a manner as to increase the sensitivity for iris recognition using an infrared filter mechanically or electronically to remarkably improve iris recognition rate.

The invention claimed is:

1. An iris recognition system using a mobile device including a stereo camera, a digital camera chip and a video input unit, the mobile device being operated in cooperation with an iris image registered and stored in other mobile devices, a remote server or a security device, the iris recognition system comprising:

the stereo camera including a single-focus lens having a long depth of focus, for taking a picture of the face and iris of a user to acquire a stereo image;

a means for converting the stereo image acquired by the stereo camera into a digital signal and calculating the distance between the stereo camera and the iris;

a means for determining whether the stereo image is out of focus and whether the position of the iris is out of a photographing range of the stereo camera using the calculated distance and judging whether the stereo image is suitable for personal identification; and a means for extracting an iris region from the stereo image and obtaining an image having a normalized size using polar coordinate conversion and interpolation methods.

2. The iris recognition system according to claim 1, wherein the means for judging whether the stereo image is suitable for personal identification further comprises a means for calculating the coordinates of the position of the user's face from the stereo camera on the basis of the stereo camera when it is judged that the stereo image is not suitable for personal identification, and then informing the user of position change through a voice, characters or an image.

3. The iris recognition system according to claim 1 or 2, wherein the means for judging whether the stereo image is suitable for personal identification further comprises a means for extracting the boundary of the pupil and the iris as an oval and determining that the stereo image is not suitable for personal identification when the extracted oval is covered with a region other than the iris.

4. The iris recognition system according to claim 1 or 2, wherein the stereo camera illuminates the user's face and/or iris with infrared rays in order to increase the sensitivity of the stereo camera and obtain a distinct iris image and takes a picture of the user's face and/or iris to acquire the stereo image.

5. The iris recognition system according to claim 1 or 2, wherein the stereo camera acquires a left image and a right image using at least two cameras or obtains at least two images through a single image sensor by using at least two optical lenses for the single image sensor.

6. An iris recognition method using a mobile device including a stereo camera for improving accuracy of iris recognition, comprising the steps of:

taking a picture of the face and/or iris of a user using the stereo camera having a single-focus lens with a long depth of focus to acquire a stereo image;

determining whether the stereo image is out of focus and whether the position of the iris is out of a photographing range of the stereo camera on the basis of the acquired stereo image to judge whether the stereo image is suitable for personal identification;

calculating the distance between the stereo camera and the user's face from the stereo image when it is judged that the stereo image is suitable for iris recognition; and acquiring an image having a normalized size using a polar coordinate transform and interpolation method that forms a plurality of circles having the same radius based on the center of the pupil and dividing the circles into predetermined angles to form polar coordinates in order to correct a variation in the size of an iris image using the calculated distance.

7. The iris recognition method according to claim 6, wherein when the step of judging whether the stereo image is suitable for personal identification further comprises a step of calculating the coordinates of the position of the user's face from the stereo camera on the basis of the camera when it is judged that the stereo image is not suitable for personal identification, and then informing the user of position change through a voice, characters or an image.

8. The iris recognition method according to claim 6 or 7, wherein the step of judging whether the stereo image is suitable for personal identification further comprises a step of extracting the boundary of the pupil and the iris as an oval and determining that the stereo image is not suitable for personal identification when the extracted oval is covered with a region other than the iris.

9. The iris recognition method according to claim 6 or 7, wherein the step of taking a picture of the user's face and/or iris to acquire a stereo image illuminates the user's face and/or iris with infrared rays in order to increase the sensitivity of the stereo camera in the infrared region and obtain a distinct iris image, and takes a picture of the user's face and/or iris to acquire the stereo image.

* * * * *